(12) United States Patent
Wakeley

(10) Patent No.: US 6,463,499 B1
(45) Date of Patent: Oct. 8, 2002

(54) DATA BUS CABLE HAVING SCSI AND IIC BUS FUNCTIONALITY AND PROCESS FOR USING THE SAME

(75) Inventor: Timothy Wakeley, Antelope, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/418,679

(22) Filed: Oct. 14, 1999

(51) Int. Cl.[7] .............................................. G06F 13/36
(52) U.S. Cl. ......................................... 710/315; 710/11
(58) Field of Search ........................... 710/315, 11, 105, 710/314

(56) References Cited

U.S. PATENT DOCUMENTS

| | | | | |
|---|---|---|---|---|
| 5,191,653 A | * | 3/1993 | Banks et al. .................. | 710/11 |
| 5,649,128 A | * | 7/1997 | Hartley ....................... | 710/305 |
| 5,727,184 A | * | 3/1998 | Richter et al. ............... | 710/305 |
| 5,794,014 A | * | 8/1998 | Shetty et al. ................. | 703/25 |
| 5,905,885 A | * | 5/1999 | Richter et al. ................ | 710/5 |
| 6,115,551 A | * | 9/2000 | Chao .......................... | 709/212 |
| 6,237,112 B1 | * | 5/2001 | Yoo et al. ..................... | 714/30 |
| 6,360,290 B1 | * | 3/2002 | Avritch et al. .............. | 710/104 |

OTHER PUBLICATIONS

"Informartion Technology—SCSI Parallel Interface-2 (SPI-2)", Ref. No. ISO/IEC 14776-112: 199x, Rev. 20b– Apr. 13, 98, pp. 11–87.

"The 12C–bus and how to use it (including specifications)", Phillips Semiconductor, May 1995, pp. 1–24.

* cited by examiner

Primary Examiner—Paul R. Myers
(74) Attorney, Agent, or Firm—David M. Mason

(57) ABSTRACT

The present invention provides a data bus cable that allows the simultaneous transfer of both SCSI and IIC signals over a conventional SCSI bus cable without changing the functionality of the same during the transfer of either signal. More specifically, the present invention utilizes two unused conductive wires of a conventional SCSI bus cable to transfer the desired IIC signals before, during, or after a SCSI signal has been sent. With this invention, a conventional system for handling both SCSI and IIC signals has been simplified to increase efficiency and reduce cost.

24 Claims, 3 Drawing Sheets

DATA BUS CABLE HAVING SCSI AND IIC BUS FUNCTIONALITY AND PROCESS FOR USING THE SAME

BACKGROUND OF THE INVENTION

1. Field of the Invention

This invention relates in general to a computer data bus cable, and more particularly to a process for using an inventive data bus cable that combines the technology and benefits of conventional SCSI and IIC buses.

2. Description of the Related Art

For over a decade the computer industry has relied on a SCSI ("small computer systems interface") bus cable to accommodate high-speed data transfer between a printed circuit board ("pcb") and an internal or external peripheral device. In recent years, many pcb and peripheral devices have added software and signals for an IIC bus that interacts with the SCSI bus operational components, via a SCSI to IIC interface circuit. The IIC bus accommodates control functions that do not require the high-speed data transfer characteristic of a SCSI bus cable.

FIG. 1 illustrates the basic components of a conventional system that utilizes a SCSI bus cable to interact with an IIC bus. In general, the system includes a primary enclosure 10 and an expansion enclosure 12 that communicate through a SCSI bus cable 14.

Primary enclosure 10, such as a personal computer ("pc"), provides a SCSI controller 18 coupled to an external SCSI connector 22, via SCSI control and data lines 20A and 20B. In addition, the primary enclosure 10 provides an IIC controller 30 coupled to internal IIC device components 28A–B, via SDA and SCL lines 32A–B.

The expansion enclosure 12, such as an array of disk drives, provides a SCSI connector 36 coupled to SCSI target components 38A–C, via SCSI data and control lines 40A–F. The expansion enclosure 12 also includes an enclosure management or housekeeping device 44 (IIC controller with SCSI interface circuitry) coupled between the SCSI target components 38B and the sensors and actuators 48A–C. The sensors and actuators 48A–C send signals to the management device 44 where they are converted into SCSI signals, passed through the SCSI bus cable 14 on designated SCSI bus lines, and evaluated by the host system of the primary enclosure 10. Depending on the evaluation of the converted IIC signals, the host system may initiate control functions selected from the group including: measuring a temperature, checking or turning on a fan, opening a door, checking power supply status, checking battery status, turning on/off LEDs, LCDs, or audible alarms, etc.

With this method, for every enclosure management device 44 that is implemented, an address of the SCSI bus must be used to transfer the converted IIC signals. In other words, since a 68 conductor wide SCSI bus cable only has 16 addresses (a 50 conductor narrow SCSI bus has 8 addresses) to transfer SCSI data and control signals, when a SCSI bus cable is used to link multiple enclosures or towers together that utilize IIC management devices, the available addresses are rapidly lost to the management devices. This in turn reduces the amount of SCSI data that can be transferred along a SCSI bus cable. To make matters worse, these management devices typically operate at slow SCSI speeds (asynchronous mode), and only one SCSI device can use the bus at a time. Hence, the high speed SCSI bus is put out of action to service a slow speed device. In turn, critical devices, such as hard drives, cannot access the SCSI bus and system performance may be degraded when the addresses used for the management devices are operational. Finally, the SCSI management devices are typically very expensive.

Like any industry, the computer industry is always looking to reduce the size or complexity of a system without having to create new standards, decrease functionality, or increase cost. One way to achieve this goal is to reduce redundancy were possible or simplify otherwise complex structures or devices. In view of the high volume and functionality of SCSI and IIC bus cables used in the computer industry today, it would be advantageous to develop a functionally simplistic, yet affordable, data transfer bus cable that can accommodate the benefits of both the SCSI and IIC bus cables simultaneously.

The present invention is directed to overcoming or at least reducing the effects of one or more of the problems set forth above.

SUMMARY OF THE INVENTION

In one aspect of the present invention, an assembly is provided for combining the benefits of a SCSI and IIC bus cable into one cable. More specifically, the present invention provides a SCSI bus cable coupled between a primary enclosure and an expansion enclosure. The primary enclosure includes an external connector coupled to an IIC controller and a SCSI controller. The expansion enclosure includes an external connector coupled to IIC device components and SCSI target components. The SCSI bus cable provides a connector at each end that couples to and compliments the primary and expansion external connectors.

In another aspect of the instant invention, a process is provided for fabricating a data bus cable that combines the benefits of a SCSI and IIC bus cable into one cable. More specifically, the process includes the steps of providing a SCSI bus cable having at least two unused conductive wires that extend between first and second SCSI bus cable connectors; electrically coupling an IIC controller to a SCSI bus connector of the primary enclosure; electrically coupling an IIC device component to a SCSI bus connector of the expansion enclosure; coupling the first SCSI bus cable connector to the SCSI bus primary connector, wherein there are at least two unused conductive wires electrically coupled to the IIC controller; and coupling the second SCSI cable connector to the SCSI bus expansion connector, wherein there are at least two unused conductive wires electrically coupled to the IIC device component.

In still another embodiment of the present invention, a data bus cable is coupled between a primary and expansion enclosure having IIC and SCSI bus components electrically coupled to a respective SCSI bus primary and expansion connector. The data bus cable comprising a plurality of conductive wires; a first connector having a plurality of conductive pins, each pin being electrically coupled to one of the plurality of conductive wires at a first end; and a second connector having a plurality of conductive pins, each pin being electrically coupled to one of the plurality of conductive wires at a second end, wherein a first portion of the plurality of conductive pins being electrically coupled to the IIC components within the primary and expansion enclosures, and a second portion of the plurality of conductive pins being electrically coupled to the SCSI components within the primary and expansion enclosures.

BRIEF DESCRIPTION OF THE DRAWINGS

Other aspects and advantages of the invention will become apparent upon reading the following detailed description and upon reference to the drawings, in which.

Figure 1:
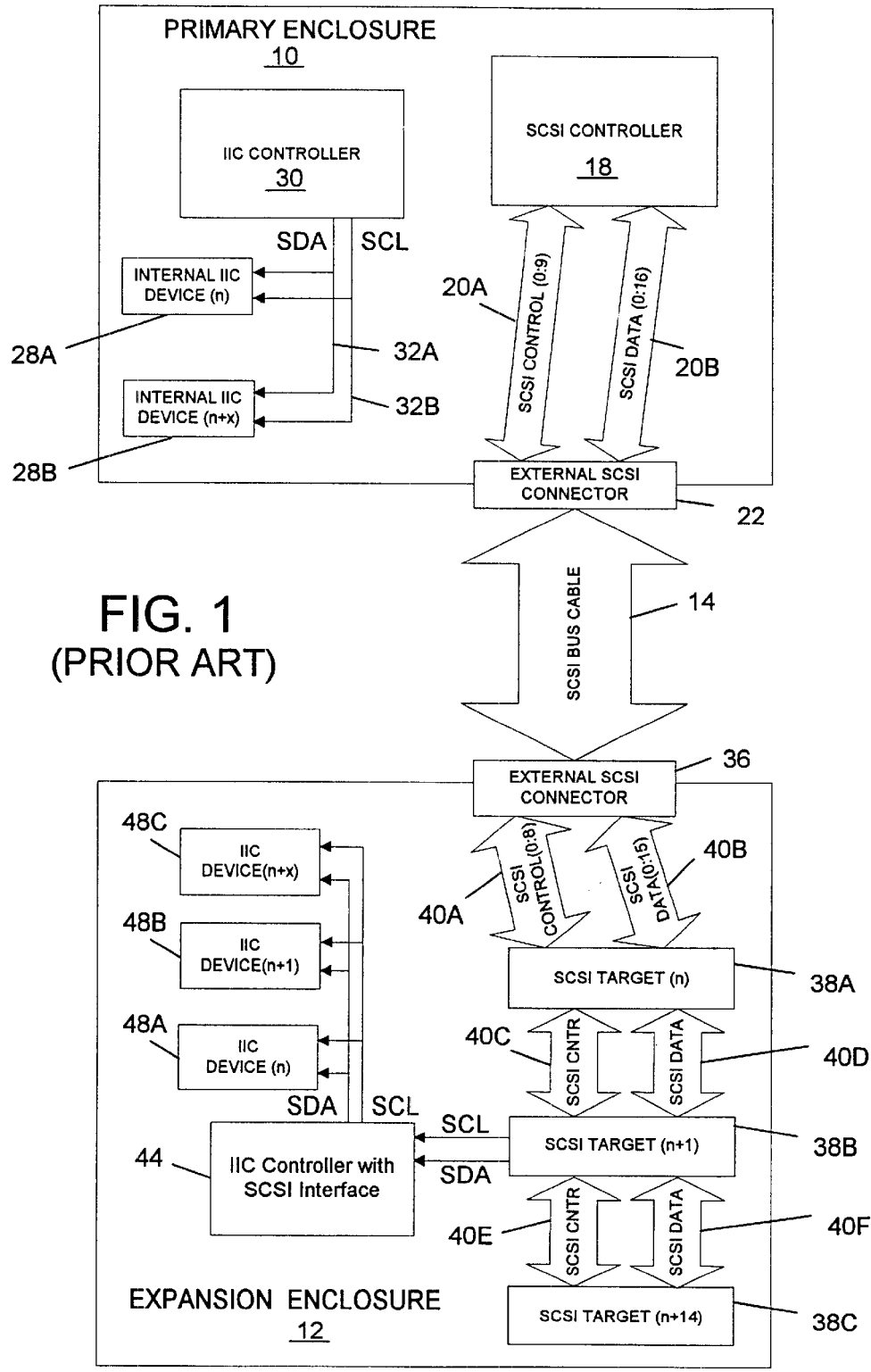
FIG. 1 illustrates a block diagram of a conventional system for utilizing a SCSI and a IIC cable between a personal computer and a peripheral device.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides a data transfer bus cable that combines the benefits of both a SCSI ("Small Computer Serial Interface") and an inter-IC bus cable. More specifically, the present invention utilizes unused conductive wires of a conventional SCSI cable to create a direct serial bus line between conventional IIC components, and thereby eliminate an expensive management device currently used. The elimination of the management device will not only reduce costs for manufacturing a system that accommodates both IIC and SCSI technologies, but it will also allow a conventional SCSI bus to operate at an optimal efficiency whether an IIC signal is transmitted or not. This has been possible by evaluating the structural and functional components of both SCSI and IIC bus cables to resolve a long felt need within the computer industry to reduce complexity while maximizing efficiency.

Even if the name SCSI implies "small computers," this standard's presence in the computer industry is anything but small. In fact, with more than 300 million SCSI products sold over the last decade, there is a solid installed base of SCSI devices that have proven their reliability, performance and compatibility. This standard is found across most platforms and size of computers from personal computers to large servers and everything in between. For example, SCSI has a strong presence in server interconnect, host connect, interconnect, subsystems and peripherals. To accommodate industry demands, SCSI has continued to improve their product with SCSI-2 and Ultra3 SCSI, and plans to still grow with the computer industry for decades to come. Consequently, SCSI products will continue to be a standard in the computer industry.

SCSI is not a simple connection to one or two devices, it acts more like a sub-bus that works at a system level, and provides a complete expansion bus into which to plug peripherals. SCSI devices can interchange data with each other without the intervention of the host computer's microprocessor. For more detailed structural and operational information regarding various SCSI cable designs, the following document is incorporated herein by reference: "Information technology—SCSI Parallel Interface-2 (SPI-2)", Ref. No. ISO/IEC 14776-112: 199x, Rev. 20b—Apr. 13, 1998, pp. 11–87.

In contrast, the Inter IC, $I^2C$, or IIC bus is a simple bi-directional 2-wire bus used for efficient inter-IC control. At present, the IIC range includes more than 150 CMOS and bipolar IIC bus compatible types for performing functions in consumer electronics, industrial electronics and telecommunications. All IIC bus compatible devices incorporate an on-chip interface, or controller circuit, which allows them to communicate directly with each other via the IIC bus. This design concept has solved many interfacing and manufacturing problems encountered when designing digital control circuits. For more detailed structural and operational information regarding various IIC cable designs, the following document is incorporated herein by reference: "The I2C-bus and how to use it (including specifications)", Phillips Semiconductor, May 1995, pp. 1–24.

Figure 2:
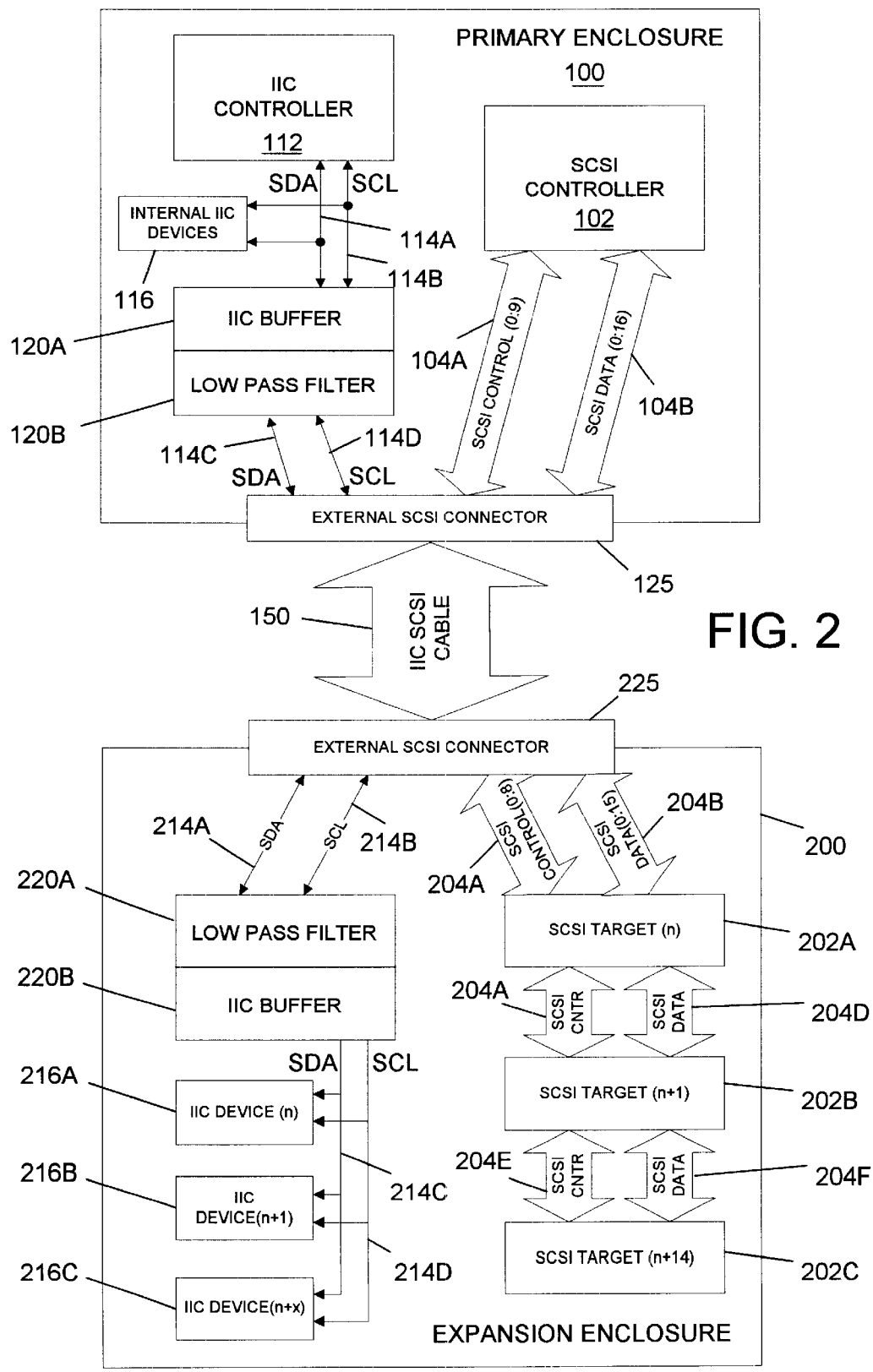
FIG. 2 illustrates a block diagram of the inventive system that utilizes a single cable having the functionality of a SCSI and IIC bus.

Referring now to the drawings, FIG. 2 illustrates a basic component layout for one embodiment of the present invention. A primary enclosure 100, such as a personal computer ("pc"), server, etc., comprises a conventional SCSI controller 102 that receives an instruction from a software program to access data in an expansion enclosure 200, such as a disc drive, CD-ROM, DVD etc., to conduct a specific function.

To use a specific operational example, once a user activates a software program, such as MS-Word, a request is sent to initiate program instructions or read/write data in the expansion enclosure 200. Simultaneously, a low level enclosure monitoring software program requests status updates from and/or issues instruction to all the sensors and actuators 116, 216A–C in the primary and expansion enclosure 100, 200. All program instructions or read/write data passes across SCSI control and data lines 104A–B and 204A–F, via inventive bus cable 150 and conventional SCSI connectors 125 and 225, to be evaluated by SCSI target components (n), (n+1) and (n+14) 202A–C.

Simultaneously, the IIC controller activates and sequentially sends a signal across the serial data ("SDA") and serial clock ("SCL") lines 114A–D and 214A–D to every sensor and/or actuator 116 and 216A–C in the primary and expansion enclosure 100, 200. To do this, the signals pass through the buffer circuit 120A and low pass filter circuit 120B, the SCSI connector 125, the inventive bus cable 150, the SCSI connector 225, and the low pass filter and buffer circuits 220A–B to be evaluated by the IIC device component (n), (n+1) and (n+x) 216A–C. Consequently, all signals are sent directly to all IIC devices 116 and 216A–C since they are all attached to the same IIC bus and no management device (see FIG. 1) is necessary to translate the IIC signals. Once the transmitted signals are evaluated, the targeted IIC sensor and/or actuator 116 and 216A–C of the primary or expansion enclosure 100 and 200 will perform a duty such as measure a temperature, check or turn on/off a fan, open a door, check power supply status, check battery status, turn on/off LEDs, LCDs, or audible alarms, etc., after being instructed by the personal computer.

The inventive bus cable 150 comprises a conventional SCSI cable having at least 2 unused pins/conductive wires that can be coupled to the SDA and SCL lines 114A–D and 214A–D of the IIC components 112, 116, 120A–B, 216A–C and 220A–B in the primary and expansion enclosure 100 and 200. For example, if a 68 conductor SCSI bus cable is used, then pins 19 and 53 (corresponding to conductors 37 and 38) are connected to SDA and SCL lines 114A–D and 214A–D. If a high density 50 conductor SCSI bus cable is used, then any of pins 12, 14, 37, or 39 (corresponding to conductors 23, 27, 24, and 28) are connected to SDA and SCL lines 114A–D and 214A–D. If a low density 50 conductor SCSI bus cable is used, then any of pins 23, 27, 24, or 28 (corresponding to conductors 23, 27, 24, and 28) are connected to SDA and SCL lines 114A–D and 214A–D.

The SDA and SCL signals pass through the SCSI connectors 125 and 225 and cable 150 unnoticed and cause no interference to the operational SCSI bus signals passing through the same. In other words, the SDA, SCL, and SCSI data and control signals can be simultaneously passed through the SCSI connectors 125 and 225 and cable 150 without jeopardizing or decreasing efficiency or efficacy of either signal. In a preferred embodiment, this inventive system will not require the SCSI and IIC software currently used for a prior art system to be modified.

The buffer and low-pass circuits 12A–B and 220A–B, before and after SCSI cable 150, are conventional. The low-pass filter and buffer circuits 120A–B and 220A–B help to filter out any high frequency noise from the SCSI signals and terminate the IIC serial bus lines if a standard SCSI device is connected to the other end of the cable that does not support the IIC enhancement. If the cross talk noise from the SCSI bus is low enough, the low-pass filter circuit 120B and/or 220B can be removed. In turn, if the total IIC bus length is short enough and if a non-compliant expansion enclosure was not attached, the buffer circuit 120A and/or 220A can be removed.

As an alternative embodiment, any number of expansion SCSI devices can be daisy chained together using the inventive cable 150. In addition, a SCSI cable with built in termination could be used if the unused lines are not connected. The unused lines in the SCSI bus are normally left unconnected, so a buffer circuit tying the unused lines (being used by SDA and SCL) together would have to be put into each enclosure. As a further alternative embodiment, a customer could connect a non-compliant expansion enclosure to the primary enclosure without affecting the operation of the IIC bus in the primary enclosure. In turn a customer could daisy chain a non-compliant enclosure to the compliant expansion enclosure without affecting the operation of the IIC bus in the compliant devices. However, the IIC bus would end at SCSI connector on the non-compliant expansion enclosure. One of the functions of the buffer circuit is to take care of this scenario.

Process of Invention

Figure 3:
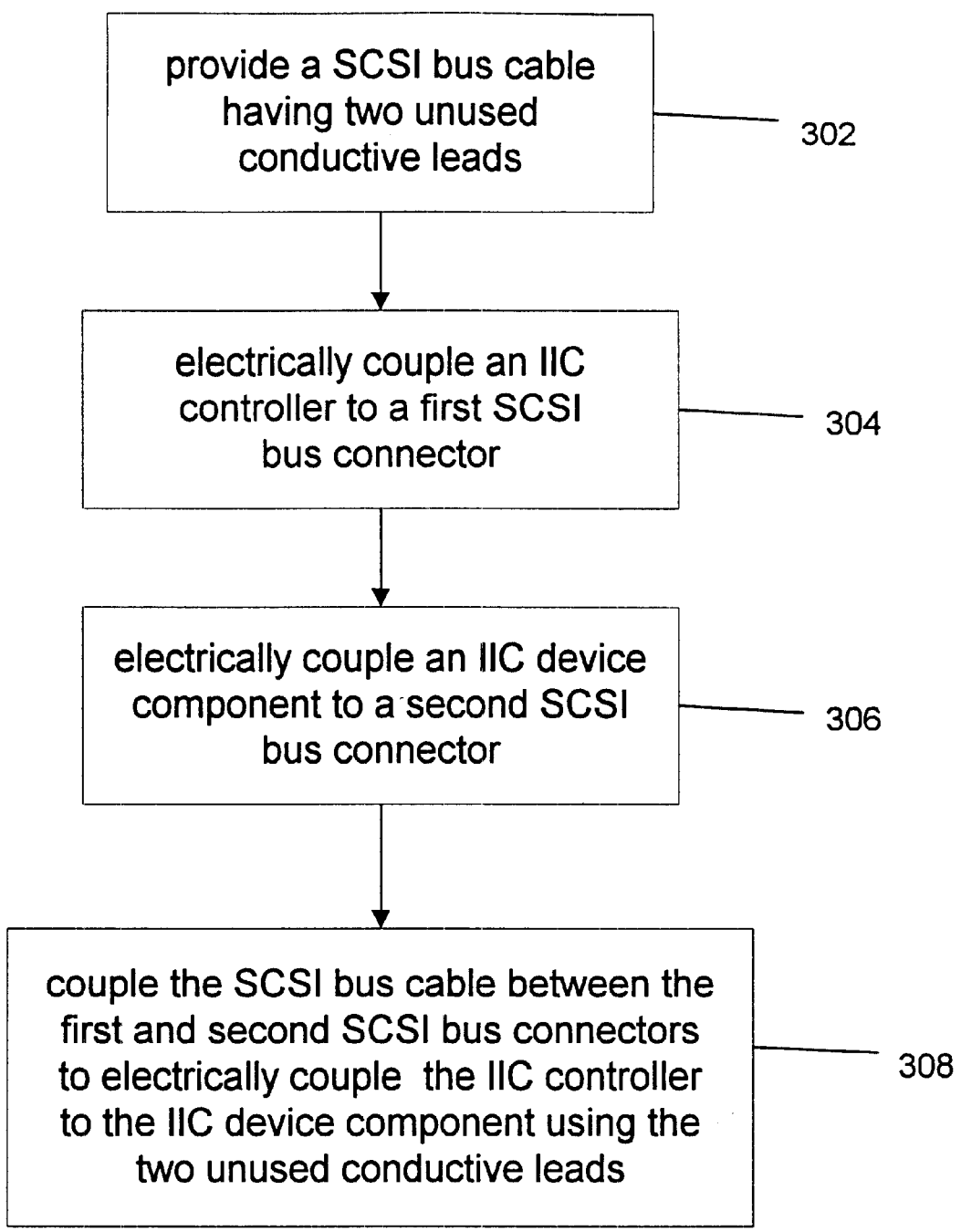
FIG. 3 illustrates a flow chart illustrating the process of using the present inventive system.

Having described the preferred component layouts and operation for the present invention, a description of the process of using will now follow with reference to FIG. 3. In general, the process involves establishing an independent IIC serial bus communication path between a primary and an expansion enclosure by utilizing 2 conventionally unused or excess SCSI cable wires and their associated pins. More specifically, the process includes "providing a SCSI bus cable having at least two unused conductive leads" 302 that extend between first and second SCSI bus cable connectors. "Electrically coupling an IIC controller to a first SCSI bus connector" 304 of the primary enclosure. An IIC buffer and low-pass filter circuit may be coupled between the IIC controller and SCSI bus connector if desired. "Electrically coupling an IIC device component to a second SCSI bus connector" 306 of the expansion enclosure. Once again, an IIC buffer and low-pass filter circuit may be coupled between the IIC device component and second SCSI bus connector if desired. Lastly, "Coupling the SCSI bus cable between the first and second SCSI bus connectors to electrically couple the IIC controller to the IIC device component using the two unused conductive leads" 308.

The process of using the inventive IIC SCSI bus cable and its operation can be employed with any conventional system that would otherwise use a separate IIC cable with an SCSI-to-IIC interface card to communicate with a peripheral device through a SCSI cable. For example, a suitable system might be a desktop computer as sold by Hewlett Packard having a CPU and memory. The memory includes ROM and RAM coupled to the CPU. Also coupled to the CPU are the display, floppy disk drive, optical disk drive, hard disk drive, mouse, and keyboard. The pc might provide a clock speed of 50 or more megahertz. However, for the above specific examples, a NAS (network attached storage) enclosure that houses a NAS micro-server was connected to an extension enclosure that would expand the number of devices that could be connected to the SCSI bus. The enclosure management functions in the main enclosure would be serviced with the IIC bus. Consequently, the invention allowed the extension enclosure to be managed with the same SCSI bus without having to use a management device or any conductive lines of the SCSI bus otherwise designated for SCSI signal transmissions.

Summary

With more than 300 million SCSI products sold over the last decade, there is a solid installed base of SCSI devices that have proven their reliability, performance and compatibility. The IIC bus has gained acceptance in the computer industry at nearly the same rate as the SCSI did during its first few years of use. Consequently, there is a long felt need for an inventive data bus cable that provides not only the benefits of the SCSI cable, but also the benefits of an IIC cable. Such an inventive IIC SCSI cable will allow the computer industry to eliminate excessive spending on management devices that under-utilize the potential of a SCSI cable, and increase the effective space on the associated computer pcb or within the computer casing. In other words, this invention will simplify conventional complex systems for using a SCSI and IIC signal and maximizing efficiency of the same.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above could be altered or modified and all such variations are considered within the scope and spirit of the invention. Accordingly, the protection sought herein is as set forth in the claims below.

What is claimed is:

1. An assembly, comprising:
   a primary enclosure including a first external connector coupled to:
      an IIC controller; and
      a SCSI controller;
   an expansion enclosure including a second external connector coupled to:
      IIC device components; and
      SCSI target components; and
   a SCSI bus cable coupled between the first and second external connector.

2. The assembly of claim 1, further including a primary buffer circuit coupled between the first external connector and the IIC controller.

3. The assembly of claim 1, further including a secondary buffer circuit coupled between the second external connector and the IIC device components.

4. The assembly of claim 2, further including a low pass filter circuit coupled between the first external connector and the IIC controller.

5. The assembly of claim 3, further including a low pass filter circuit coupled between the second external connector and the IIC device components.

6. The assembly of claim 1, wherein the SCSI bus cable further includes a plurality of conductive wires used only for SCSI bus signal transfer and two additional conductive wires used only for IIC bus signal transfer, wherein the SCSI and IIC bus signal transfers can occur simultaneously.

7. The assembly of claim 1, wherein SCSI target addresses are not utilized to transfer data from the IIC devices to the host system over the SCSI bus.

8. The assembly of claim 1, wherein the SCSI bus cable is a high density bus cable.

9. The assembly of claim 1, wherein the SCSI bus cable is a low density bus cable.

10. The assembly of claim 8, wherein the high density SCSI bus cable can be selected from a 50 or 68 wire cable structure.

11. The assembly of claim 9, wherein the low density SCSI bus cable is a 50 wire cable structure.

12. The assembly of claim 1, wherein the primary enclosure can be selected from the group including a personal computer and a server.

13. The assembly of claim 1, wherein the expansion enclosure is peripheral device.

14. The assembly of claim 13, wherein the peripheral device is selected from the group including disc drive, CD-ROM, and DVD.

15. The assembly of claim 1, where the two additional conductive wires can be any two wire serial bus cable selected from the group including an IIC bus and an SM bus.

16. The assembly of claim 1, wherein the SCSI bus cable provides 2 target address lines for the IIC controller and IIC device components to communicate, and 16 target address lines for the SCSI controller and SCSI target components to communicate.

17. The assembly of claim 1, wherein the SCSI bus cable provides 2 target address lines for the IIC controller and IIC device components to communicate, and 8 target address lines for the SCSI controller and SCSI target components to communicate.

18. A process of manufacturing a system that utilizes a SCSI bus cable having at least two unused conductive wires coupled between a primary and expansion enclosure to simultaneous transfer both SCSI and IIC signal information, comprising:

a) providing the SCSI bus cable having at the least two unused conductive wires that extend between first and second SCSI bus cable connectors;

b) electrically coupling an IIC controller to a SCSI bus connector of the primary enclosure;

c) electrically coupling an IIC device component to a SCSI bus connector of the expansion enclosure;

d) coupling the first SCSI bus cable connector to the SCSI bus connector of the primary enclosure, wherein the at least two unused conductive wires electrically couple to the IIC controller; and e) coupling the second SCSI bus cable connector to the SCSI bus expansion connector, wherein the at least two unused conductive wires electrically couple to the IIC device component.

19. The process of claim 18, further including:

electrically coupling a first buffer circuit between the SCSI bus connector and the IIC controller of the primary enclosure; and electrically coupling a second buffer circuit between the SCSI bus connector and the IIC device components of the expansion enclosure.

20. The process of claim 19, further including:

electrically coupling a first low-pass filter circuit between the SCSI bus connector and the first buffer circuit of the primary enclosure; and electrically coupling a second low-pass filter circuit between the SCSI bus connector and the second IIC buffer circuit of the expansion enclosure.

21. The process of claim 18, further including:

electrically coupling a SCSI controller to the SCSI bus connector of the primary enclosure; and electrically coupling a SCSI target component to the SCSI bus connector of the expansion enclosure, wherein the steps of electrically coupling the first and second SCSI bus cable connectors to the SCSI bus primary and expansion connectors further includes electrically coupling the SCSI controller to the SCSI target component.

22. A data bus cable being coupled between a primary and expansion enclosure having IIC and SCSI electronic component electrically coupled to a respective SCSI bus primary and expansion connector, the data bus cable comprising:

a plurality of conductive wires;

a first connector having a plurality of conductive pins, each pin being electrically coupled to one of the plurality of conductive wires at a first end; and a second connector having a plurality of conductive pins, each pin being electrically coupled to one of the plurality of conductive wires at a second end, wherein a first portion of the plurality of conductive pins being electrically coupled to the IIC components within the primary and expansion enclosures, and a second portion of the plurality of conductive pins being electrically coupled to the SCSI components within the primary and expansion enclosures.

23. The assembly of claim 22, wherein the first portion of the conductive pins provide 2 target address lines for the IIC components to communicate, and the second portion of conductive pins provide 16 target address lines for the SCSI components to communicate.

24. The assembly of claim 22, wherein the first portion of the conductive pins provide 2 target address lines for the IIC components to communicate, and the second portion of conductive pins provide 8 target address lines for the SCSI components to communicate.

* * * * *